United States Patent
Brown et al.

(10) Patent No.: US 11,017,384 B2
(45) Date of Patent: May 25, 2021

(54) APPARATUSES AND METHODS FOR USING A PRIMARY USER DEVICE TO PROVISION CREDENTIALS ONTO A SECONDARY USER DEVICE

(71) Applicant: Apple inc., Cupertino, CA (US)

(72) Inventors: Jeremy T. Brown, San Francisco, CA (US); George R. Dicker, Sunnyvale, CA (US); Glen W. Steele, San Jose, CA (US); Morgan J. Grainger, Los Altos, CA (US); Zachary A. Rosen, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1045 days.

(21) Appl. No.: 14/475,268

(22) Filed: Sep. 2, 2014

(65) Prior Publication Data

US 2015/0348025 A1    Dec. 3, 2015

Related U.S. Application Data

(60) Provisional application No. 62/004,835, filed on May 29, 2014.

(51) Int. Cl.
*G06Q 20/38* (2012.01)
*G06Q 20/36* (2012.01)
(Continued)

(52) U.S. Cl.
CPC ......... *G06Q 20/3821* (2013.01); *G06Q 20/12* (2013.01); *G06Q 20/20* (2013.01);
(Continued)

(58) Field of Classification Search
CPC .. G06Q 20/3674; G06Q 20/322; G06Q 10/06; G06Q 30/0226; G06Q 20/3278;
(Continued)

(56) References Cited

U.S. PATENT DOCUMENTS

| 5,924,042 | A | 7/1999 | Sakamoto et al. |
| 6,282,612 | B1 * | 8/2001 | Sakajiri ............ H04M 1/72409 711/115 |

(Continued)

FOREIGN PATENT DOCUMENTS

| CN | 102254259 A | 11/2011 |
| CN | 103310337 A | 9/2013 |

(Continued)

OTHER PUBLICATIONS

Grainger, U.S. Appl. No. 14/475,424, filed Sep. 2, 2014.
(Continued)

*Primary Examiner* — Johann Y Choo
(74) *Attorney, Agent, or Firm* — Treyz Law Group, P.C.; Tianyi He

(57) ABSTRACT

A system for provisioning credentials onto an electronic device is provided. The system may include a payment network subsystem, a service provider subsystem, a primary user device, and a secondary user device. The user may select a particular payment card to provision onto the secondary user device by providing an input at the primary user device. A broker module running on the service provider subsystem may then transfer a disabled pass to the secondary user device. Concurrently, the payment network subsystem may direct a trusted service manager module on the service provider subsystem to write credential information onto a secure element within the secondary user device. Once the secure element has been updated, the broker module may provide an activated pass to the secondary user device so that the secondary user device can be used to perform NFC-based financial transactions at a merchant terminal.

11 Claims, 7 Drawing Sheets

(51) Int. Cl.
*G06Q 20/34* (2012.01)
*G06Q 20/20* (2012.01)
*G06Q 20/32* (2012.01)
*G06Q 20/12* (2012.01)

(52) U.S. Cl.
CPC ..... *G06Q 20/3227* (2013.01); *G06Q 20/3278* (2013.01); *G06Q 20/351* (2013.01); *G06Q 20/354* (2013.01); *G06Q 20/367* (2013.01)

(58) Field of Classification Search
CPC ........... G06Q 20/4016; G06Q 30/0241; G06Q 30/0185; G06Q 30/0645; G06Q 50/01; G06Q 20/3274; G06Q 10/087; G06Q 20/389; G06Q 2220/10
See application file for complete search history.

(56) References Cited

U.S. PATENT DOCUMENTS

| | | |
|---|---|---|
| 6,703,918 B1 | 3/2004 | Kita |
| 6,868,074 B1 | 3/2005 | Hanson |
| 6,974,078 B1 | 12/2005 | Simon |
| 6,985,078 B2 | 1/2006 | Suzuki et al. |
| 7,900,833 B2 | 3/2011 | Silverbrook et al. |
| 7,946,477 B1 | 5/2011 | Ramachandran et al. |
| 8,065,235 B2 | 11/2011 | Narayanaswami et al. |
| 8,113,438 B1 | 2/2012 | Leason et al. |
| 8,126,806 B1 | 2/2012 | DiMartino et al. |
| 8,196,131 B1 | 6/2012 | Von Behren |
| 8,223,024 B1 | 7/2012 | Petrou |
| 8,335,932 B2 | 12/2012 | von Behren |
| 8,346,672 B1 | 1/2013 | Weiner et al. |
| 8,380,177 B2 | 2/2013 | Laracey |
| 8,649,770 B1 | 2/2014 | Cope et al. |
| 8,666,895 B2 | 3/2014 | Grigg et al. |
| 9,078,128 B2 * | 7/2015 | Medina ............... H04W 12/069 |
| 9,129,273 B2 | 9/2015 | Baldwin et al. |
| 9,826,060 B1 * | 11/2017 | Johansson ........... H04L 63/0428 |
| 2002/0059446 A1 * | 5/2002 | Visalli ..................... H04L 67/42 709/236 |
| 2002/0152393 A1 * | 10/2002 | Thoma ..................... H04L 67/06 713/189 |
| 2003/0001722 A1 | 1/2003 | Smith et al. |
| 2003/0028481 A1 | 2/2003 | Flitcroft et al. |
| 2004/0054629 A1 * | 3/2004 | de Jong ................. H04L 9/3213 705/51 |
| 2004/0225613 A1 | 11/2004 | Narayanaswami et al. |
| 2006/0288233 A1 * | 12/2006 | Kozlay .................... G06F 21/35 713/186 |
| 2007/0050618 A1 | 3/2007 | Roux et al. |
| 2007/0162350 A1 | 7/2007 | Friedman |
| 2007/0206743 A1 * | 9/2007 | Chang .................... H04M 15/00 379/127.03 |
| 2008/0011833 A1 | 1/2008 | Saarisalo |
| 2008/0045805 A1 | 2/2008 | Keppler |
| 2008/0235144 A1 * | 9/2008 | Phillips ................ G06Q 20/327 705/67 |
| 2009/0159678 A1 | 6/2009 | Day et al. |
| 2009/0165141 A1 * | 6/2009 | Kakehi .................... G06F 21/10 726/26 |
| 2009/0212902 A1 * | 8/2009 | Haddock ................. G06F 21/34 340/5.2 |
| 2010/0023449 A1 | 1/2010 | Skowronek et al. |
| 2011/0165896 A1 * | 7/2011 | Stromberg ......... G06Q 20/3226 455/466 |
| 2011/0214158 A1 | 9/2011 | Pasquero et al. |
| 2011/0239304 A1 | 9/2011 | Saarisalo |
| 2012/0011572 A1 | 1/2012 | Chew et al. |
| 2012/0024947 A1 * | 2/2012 | Naelon .................. G06Q 20/20 235/380 |
| 2012/0030043 A1 | 2/2012 | Ross et al. |
| 2012/0221421 A1 | 8/2012 | Hammad |
| 2012/0241524 A1 | 9/2012 | Blot et al. |
| 2012/0244805 A1 | 9/2012 | Haikonen et al. |
| 2012/0266220 A1 * | 10/2012 | Brudnicki ............. G06F 21/629 726/6 |
| 2012/0300932 A1 * | 11/2012 | Cambridge ............ G06Q 40/00 380/270 |
| 2013/0060618 A1 | 3/2013 | Barton et al. |
| 2013/0069985 A1 | 3/2013 | Wong et al. |
| 2013/0073448 A1 | 3/2013 | Wall et al. |
| 2013/0111599 A1 | 5/2013 | Gargiulo |
| 2013/0151140 A1 | 6/2013 | Makhotin et al. |
| 2013/0151400 A1 * | 6/2013 | Makhotin ............. G06Q 20/32 705/39 |
| 2013/0173477 A1 | 7/2013 | Cairns |
| 2013/0332353 A1 * | 12/2013 | Aidasani ............... G06Q 20/321 705/41 |
| 2014/0058937 A1 | 2/2014 | Watson |
| 2014/0108260 A1 * | 4/2014 | Poole .................... G06Q 20/382 705/64 |
| 2014/0129438 A1 | 5/2014 | Desai et al. |
| 2014/0244495 A1 | 8/2014 | Weiner et al. |
| 2014/0325614 A1 | 10/2014 | Rhelimi |
| 2014/0344153 A1 * | 11/2014 | Raj ..................... G06Q 20/3821 705/44 |
| 2015/0058191 A1 | 2/2015 | Khan et al. |
| 2015/0271091 A1 * | 9/2015 | Maruyama .............. H04L 47/78 709/226 |
| 2016/0180063 A1 * | 6/2016 | Bhandaru ............. G06F 21/105 726/26 |

FOREIGN PATENT DOCUMENTS

| | | | |
|---|---|---|---|
| CN | 103745350 A | 4/2014 | |
| EP | 2388744 A2 | 11/2011 | |
| GB | 2277183 | 10/1994 | |
| GB | 2407189 | 4/2005 | |
| KR | 10-2007-0048860 | 5/2007 | |
| KR | 1020110005889 A | 1/2011 | |
| KR | 20110094732 A | 8/2011 | |
| KR | 20140023606 A | 2/2014 | |
| KR | 10-2014-0063816 | 5/2014 | |
| WO | 2008147457 | 12/2008 | |
| WO | 2009039419 A1 | 3/2009 | |
| WO | WO-2009039419 A1 * | 3/2009 | ........... G06Q 20/341 |
| WO | 2010111002 | 9/2010 | |
| WO | 2010128442 A2 | 11/2010 | |
| WO | 2014122451 | 8/2014 | |
| WO | 2014143916 | 9/2014 | |

OTHER PUBLICATIONS

Maragoudakis, International Patent Application No. PCT/US2013/032529 filed on Mar. 15, 2013.
Video: Forget smartphones and NFC, 'Coin' is the future of payments. Zach Epstein, Nov. 14, 2013 [retrieved on Oct. 2, 2014]. Retrieved from the Internet: <http://news.yahoo.com/video-forget-smartphones-nfc-coin-future-payments-170024328.html>.
Bell ID Secure Element in the Cloud. Bell ID [retrieved on Oct. 3, 2014]. Retrieved from the Internet: <http://bellid.com/products/secure-element-in-the-cloud/>.
Khan, U.S. Appl. No. 14/475,263, filed Sep. 2, 2014.
European Search Report dated Mar. 8, 2016, for application No. 14765497.4, 8 pages.
Maragoudakis, U.S. Appl. No. 14/775,349, filed Sep. 11, 2015.
International Search Report and Written Opinion dated Jun. 30, 2015 in PCT/US2015/024447, 9 pages.
Haggerty et al., U.S. Appl. No. 61/909,717, filed Nov. 27, 2013.
Brown et al., U.S. Appl. No. 62/004,338, filed May 29, 2014.
International Search Report and Written Opinion dated Apr. 6, 2015 in PCT Application No. PCT/US14/28095, 14 pages.
International Search Report and Written Opinion dated Sep. 6, 2014 in PCT Application No. PCT/US13/32529 19 pages.
First Communication Pursuant to Art. 94 (3) dated Feb. 28, 2016 from the European Patent Office in Application No. 15716386.6, 7 pages.

(56) References Cited

OTHER PUBLICATIONS

Notice of Preliminary Rejection dated Apr. 5, 2018 from the Korean Patent Office in Application No. 10-2018-7004687, 15 pages.
Third Office Action dated Apr. 25, 2018 in Chinese Patent Application No. 201480014667.5, 18 pages, including English translation.
Office Action dated Dec. 5, 2018 in Chinese Patent Application No. 20150021465.8, 20 pages (includes English translation).
Notice of Allowance dated Dec. 12, 2018 in U.S. Appl. No. 15/186,114, 8 pages.
Notice of Allowance dated Nov. 20, 2017 in Korean Application No. 10-2016-7030455. 11 pages includes English translation.
Notification of the Second Office Action dated Nov. 7, 2017 in Chinese Patent Application No. 201480014667.5. 7 pages includes English translation.

* cited by examiner

APPARATUSES AND METHODS FOR USING A PRIMARY USER DEVICE TO PROVISION CREDENTIALS ONTO A SECONDARY USER DEVICE

CROSS-REFERENCE TO RELATED APPLICATION(S)

This application is related to U.S. Non-Provisional patent application Ser. No. 14/092,205, entitled "Secure Provisioning of Credentials on an Electronic Device," by Inventors Joakim Linde et al., filed on Nov. 27, 2013, to U.S. Provisional Patent Application Ser. No. 61/909,717, entitled "Provisioning of Credentials on an Electronic Device Using Passwords Communicated Over Verified Channels," by Inventors David Haggerty et al., filed on Nov. 27, 2013, and to U.S. Provisional Patent Application Ser. No. 62/004,338, entitled "User Device Participation in Transactions via Local Secure Element Detection of Mechanical Input," by Inventors Jeremy T. Brown et al., filed on May 29, 2014.

This application claims the benefit of provisional patent application No. 62/004,835, filed May 29, 2014, which is hereby incorporated by reference herein in its entirety.

BACKGROUND

This relates generally to electronic devices, and more particularly, to provisioning commerce credentials onto an electronic device.

Portable electronic devices such as cellular telephones are sometimes provided with near field communications (NFC) circuitry that allows the electronic devices to perform contactless proximity-based communications with a corresponding NFC reader. Often times, the NFC circuitry in a user device is used to carry out financial transactions or other secure data transactions that require the user device to verify and access a commerce credential such as a credit card credential. In order to carry out financial transactions or other secure data transactions using a device, commerce credentials (such as credit card credentials) must be provisioned onto the device.

In some situations, a user may operate more than one electronic device. In such a situation, the user may wish to provision commerce credentials onto his/her devices so that the devices are usable to perform NFC-based financial transactions.

SUMMARY

An illustrative system and methods for provisioning payment cards onto a secondary user device via a primary user device are provided.

In accordance with an embodiment, the system may include a service provider subsystem that is configured to receive information associated with the secondary user device from the primary user device and to send a digital wallet pass corresponding to a payment card that is to be provisioned onto the secondary user device through the primary user device.

In accordance with another embodiment, the system may include a payment network subsystem and a service provider subsystem that communicates with the secondary user device through the primary user device. The secondary user device may include a secure element on which one or more commerce credentials corresponding to the payment card(s) can be stored. The secure element may have a unique secure element identifier (SEID).

The primary user device may obtain information reflective of the current state of the secure element from the secondary user device. The primary user device may forward this information to a broker module at the service provider subsystem, along with the SEID and a push token that is associated with only that particular secondary user device. The push token may serve as a unique identifier that allows the service provider subsystem to send efficient, lower-power messages to the secondary user device via a proxy server. The broker module may be used to pair the SEID with the push token so that the service provider subsystem knows which user device contains the secure element with the corresponding SEID. The broker module may provide a list of payment cards to be displayed to a user at the primary user device. The user may select a payment card from the list and may be prompted to enter security information associated with the selected payment card at the primary user device.

The security information entered at the primary user device may be sent to the service provider subsystem and may then be forwarded to a payment network subsystem to determine the whether the user input is valid. If the user input is correct, the broker module may send a digital wallet pass corresponding to the selected payment card to the secondary user device through the primary user device. The digital wallet pass may include a virtual commerce credential identifier (sometimes referred to herein as a device primary account number identifier or "D-PAN" ID) that is mapped to the D-PAN itself. The D-PAN may be linked to the actual commerce credential of the selected payment card (sometimes referred to herein as a funding primary account number or "F-PAN") via a linking table that is stored on the payment network subsystem. At this point, the digital wallet pass may be in a disabled or "non-personalized" state and can not yet be selected for payment.

If the user input is correct, the payment network subsystem may also be configured to send a secure element personalization script to a trusted service manager (TSM) module at the service provider subsystem. In response to receiving this script, the TSM module will send a TSM push notification using the previously received push token to the secondary user device and may send a series of commands to update the state of the secure element on the secondary user device. Once all the commands in the script have been successfully executed, the broker module may send a broker push notification (also using the previously received push token) to the secondary user device to tell the secondary user device that a new pass is now ready to be loaded into the secondary user device.

The broker module may subsequently send an updated digital wallet pass corresponding to the selected payment card to the secondary user device through the primary user device. At this point, the digital wallet pass may be in an enabled or "personalized" state and can now be selected for payment at a merchant terminal. In general, the user should be able to control the provisioning of credentials onto the secondary device by interfacing with only the primary user device, and once the secondary device has been provisioned, the secondary device can be used to perform mobile financial transactions at a point-of-sale terminal independently from the primary user device.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

DETAILED DESCRIPTION

Figure 1:
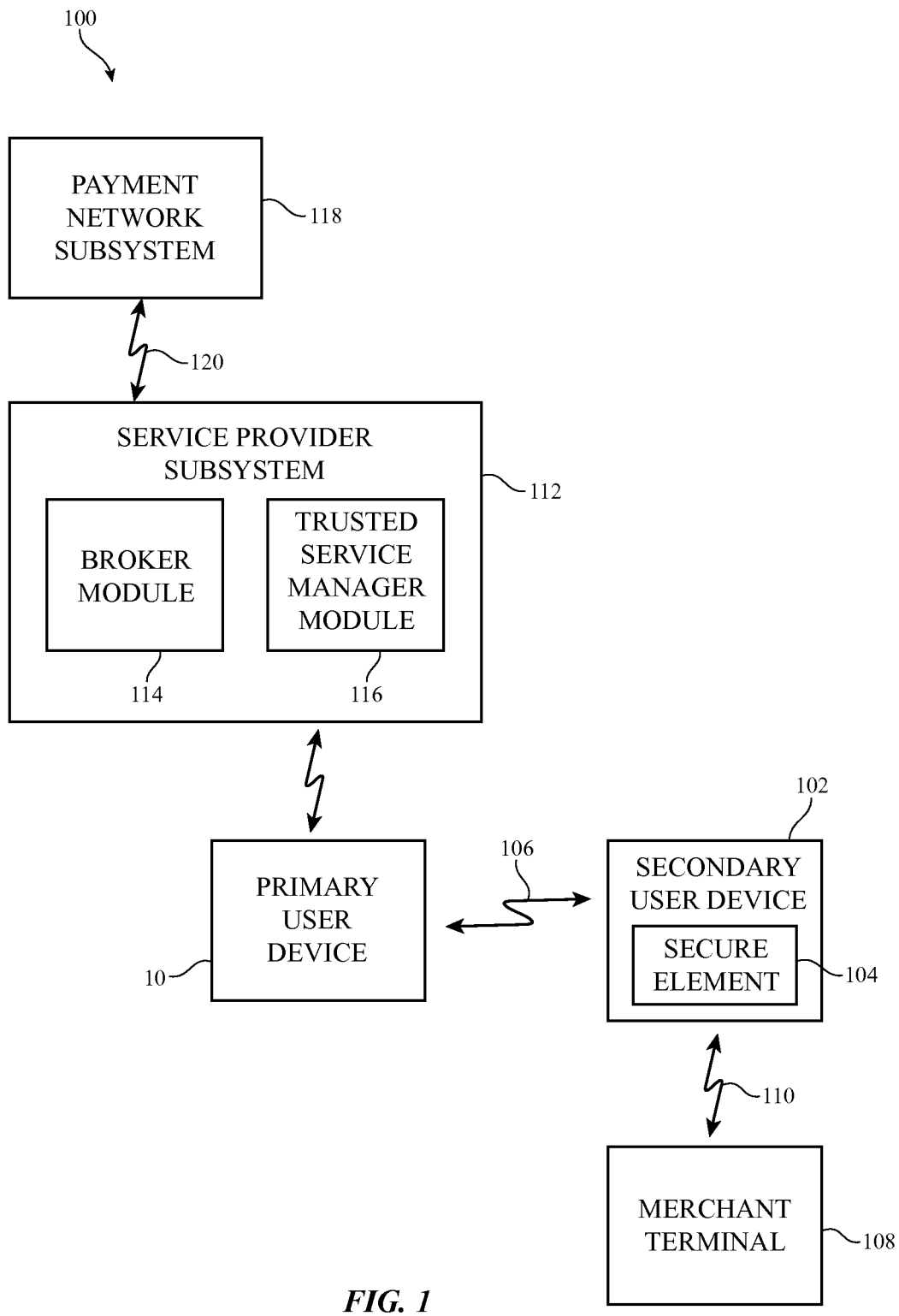
FIG. 1 is a diagram of an illustrative system for provisioning credentials onto a secondary user device via a primary user device in accordance with an embodiment.

FIG. 1 shows a diagram of a system 100 in which credential information can be provisioned onto one or more electronic devices from a payment network subsystem 118 using a service provider subsystem 112. User devices that have been provisioned with credentials from payment network subsystem 118 may be used to conduct a financial transaction with a merchant terminal such as merchant terminal 108. User devices may, for example, communicate with merchant terminal 108 via contactless proximity-based communications (e.g., using near field communications (NFC) standards). Terminal 108 (sometimes referred to as a "point-of-sale" terminal) may include an NFC reader for detecting, reading, or otherwise receiving information from a nearby electronic device.

For example, a user may hold a provisioned electronic device within range of merchant terminal 108 to initiate a commercial transaction. Actual physical contact between the user device and the merchant terminal need not be present. While the electronic device is within range of merchant terminal 108 (e.g., when the user device is within 10 cm of terminal 108, when the user device is within 5 cm of terminal 108, when the user device is within 1 cm of terminal 108, or when the distance between the user device and the merchant terminal has other suitable values), the electronic device may send a selected credential to merchant terminal 108. In response to receiving the selected credential, merchant terminal 108 may complete the payment by forwarding the received credential to a corresponding payment processor (not shown). The payment processor may utilize the user credential to complete the transaction with payment network subsystem 118. This example in which payment transactions are performed via NFC is merely illustrative and does not limit the scope of the present invention. If desired, financial transactions may be carried out over Bluetooth® communications links, personal area network (PAN) communications links, wireless local area network (WLAN) communications links, or other short-range wireless communications links.

Payment network subsystem 118 may be operated by a financial entity that includes a network of various issuing banks and/or acquiring banks (e.g., payment processors). The financial entity at the payment network subsystem 118 may serve as a generic payment card association (e.g., a credit card association) that partners with one or more issuing/acquiring banks that are associated with different brands of commerce credentials and may sometimes be referred to as a payment network operator. The payment network operator and associated issuing/acquiring banks may be a single entity or separate entities.

For example, American Express may be both a payment network operator and an issuing/acquiring bank. As another example, Visa and MasterCard may be a payment network operator that partners with other issuing/acquiring banks such as Bank of America, Wells Fargo, and Chase, just to name a few. The issuing bank may be the financial institution that assumes primary liability for each user's capability to pay off debts incurred using a particular brand of payment card. Various types of payment cards that can be issued may include but are not limited to: credit cards, debit cards, charge charges, stored-value cards, transit cards, fleet cards, and gift cards.

User payment card credentials may be provisioned from such financial entities onto user devices using a service provider subsystem such as service provider subsystem 112. Service provider subsystem 112 may be configured to provide another layer of security and/or to provide a more seamless user experience. For example, service provider subsystem 112 may be operated by a commercial service entity that offers various services to the user, which may include: an online store for selling/renting media to be played by the user device, an online store for selling/renting applications to be run on the user device, an online storage service for backing up and synchronizing data among multiple user devices, a remote device management service for tracking the location of the user device and remotely controlling that device, an online store that allows the user to purchase additional user devices or products (e.g., products manufactured by that commercial entity), etc. As another example, service provider subsystem 112 may be operated by a mobile network operator such as Verizon or AT&T.

In either scenario, the commercial entity at the service provider subsystem 112 may at least provide different users with their own personalized accounts for accessing the services offered by that commercial entity. Each user account may be associated with a personalized user identification (ID) and password that the user may use to log in into his/her account. Once logged in, the user may be presented with the opportunity to provision one or more commerce credentials (e.g., payment cards) onto the user device to enable the user device to purchase items using services offered by the commercial entity and/or to perform financial transactions at a merchant terminal 108.

In general, the commercial entity at the service provider subsystem 112 and the financial entity at the payment network subsystem 118 are considered separate entities. The commercial entity may leverage any known credential information associated with each of its user accounts to more securely determine whether a specific credential offered by the payment network operator ought to be provisioned onto a given user device. If desired, the commercial entity may also leverage its ability to configure or control various components of the user device (e.g., via software of firmware updates) in order to provide a more seamless experience for the user when he or she wants to provision a credential offered by the payment network operator onto a given user device.

As shown in FIG. 1, service provider subsystem 112 may include a broker module 114 and a trusted service manager (TSM) module 116. Broker module 114 may serve to manage user authentication with a commercial entity user account and may also serve to manage the lifecycle and provisioning of credentials onto a user device. Broker module 114 may also be configured to control the user interface (e.g., the graphical user interface) that is displayed on the user device and to process any user inputs related to provisioning commerce credentials on the user device. When it is desired to provision a card onto the user device, broker module 114 may send a notification to payment network subsystem 118 via path 120.

In response to receiving the notification from broker module 114, payment network subsystem 118 may communicate directly with TSM module 116 to carry out credential provisioning operations on the user device. TSM 116 may serve to provide GlobalPlatform or other secure transactions based services so that TSM 116 can set up a secure channel between service provider subsystem 112 and a secure element within the user device. Commerce credential, payment card information, and/or other sensitive account data may then be conveyed from the trusted service manager 116 to the secure element in the device via the secure channel. In general, TSM 116 may use public/private keys or other cryptographic schemes to ensure that communication between service provider subsystem 112 and the secure element within the user device is protected.

Still referring to FIG. 1, a user may be in possession of multiple devices such as devices 10 and 102. Device 10 may be referred to as a "primary" user device, whereas device 102 may be referred to as a "secondary" user device. In general, the primary user device 10 may be provided with more functions than the secondary user device 102. For example, primary user device 10 may serve as the user's main device for use in accessing an entire array of services offered by service provider subsystem 112, for making telephone calls, for selecting new cards to be provisioned on one of devices 10 and 102, for capturing images, and for accessing the Internet, whereas secondary user device 102 may serve as an accessory device for use in accessing only a subset of the services provided by the commercial entity at the service provider subsystem 112 and for use in making payments at merchant terminal 108 via NFC communications path 110. However, it should be understood that the terms "primary" and "secondary" are used for ease of description and that, in some instances, the "secondary" device implement functionality identical to or greater than the functionality implemented by the "primary" device.

In the example of FIG. 1, secondary user device 102 may include a secure element 104. Secure element 104 may serve as a tamper-resistant component (e.g., as a single chip or multichip secure microcontroller) that is capable of securely hosting applications and their confidential and cryptographic data in accordance with rules and security requirements set forth by well-identified trusted authorities such as GlobalPlatform. Secure element (SE) 104 may be provided as a universal integrated circuit card (UICC), an embedded SE, a smart secure digital (SD) card, a microSD card, etc. Sensitive user information such as credit card information and other commerce credentials may be stored on secure element 104. Secure element 104 provides a secure domain that protects the user's credentials and processes desired payment transactions in a trusted environment without compromising the safety of the user's data. In general, each secure element 104 may have its own unique identifier sometimes referred to herein as the SEID. No two secure elements 104 should have the same SEID, and the SEID cannot be altered.

In system 100, it may be desirable to provision credentials onto the secondary device 102. The provisioning of credentials onto the secondary device 102 may be managed using a secondary device credential management application (sometimes referred to as a "bridging" application) running on the primary user device 10. For example, a user may provide input to the primary user device 10 indicating that the user intends to provision new or additional commerce credentials (e.g., payment card credentials) onto the secondary device 102. In response to such input, the primary user device 10 will send a corresponding request to service provider subsystem 112, and as a result, payment network subsystem 118 may provide the desired payment card information that is then securely written into secure element 104 on the secondary device 104 via the primary user device 10 and path 106. The communications path 106 between primary user device 10 and secondary user device 106 may be supported via Bluetooth® (e.g., via Bluetooth Low Energy and/or Bluetooth "Classic" technologies), IEEE 802.11 protocols—sometimes referred to as WiFi®, or other short-range wireless communications technologies (as examples).

Arranged in this way, primary user device 10 serves as a proxy device through which information may be conveyed during credential provisioning operations. The example of FIG. 1 in which only secondary user device 102 includes a secure element is merely illustrative. If desired, primary user device 10 may also include a secure element on which commerce credential information can be stored (e.g., device 10 may also be used for contactless proximity-based payment at a point-of-sale terminal 108).

Figure 2A:
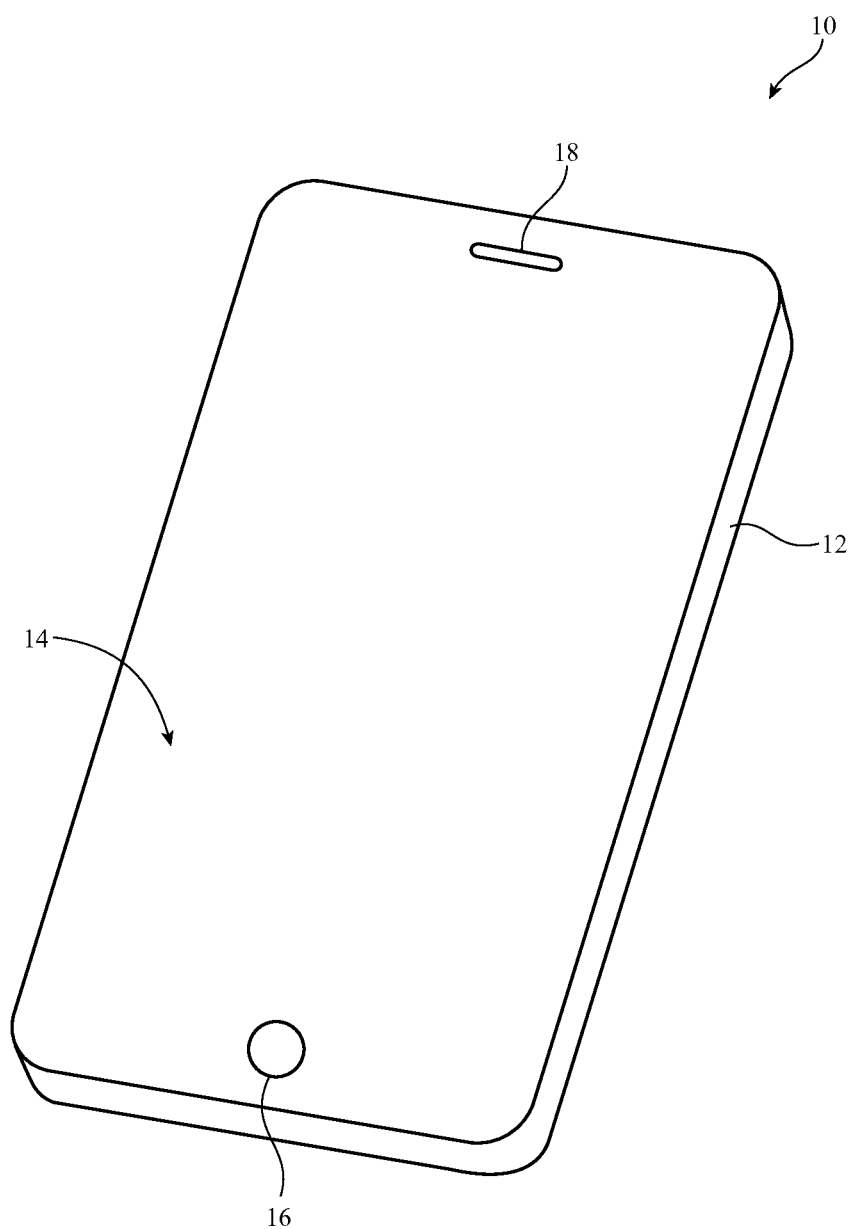
FIG. 2A is a perspective view of an illustrative primary user device in accordance with an embodiment.

FIG. 2A shows a perspective view of primary user device 10. Device 10 may be a portable device such as a cellular telephone, media player, tablet computer, or other portable computing device. The example of FIG. 2A is merely illustrative. Other configurations may be used for device 10, if desired. As shown in FIG. 2A, device 10 may include a display such as display 14. Display 14 has been mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18. Openings may be formed in housing 12 to form communications ports (e.g., an audio jack port, a digital data port, etc.).

Figure 2B:
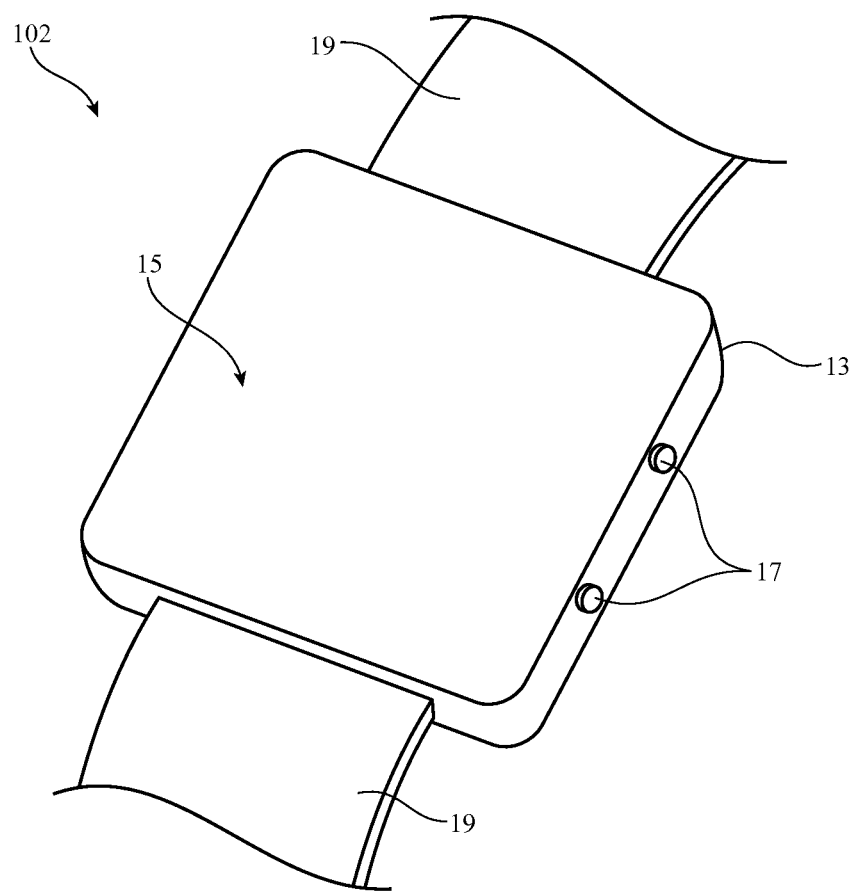
FIG. 2B is a perspective view of an illustrative secondary user device in accordance with an embodiment.

FIG. 2B shows a perspective view of a secondary user device 102. Electronic device 102 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In at least some embodiments, secondary user device 102 serves as an auxiliary device to primary device 10, where device 102 can be used to perform specialized functions for the user.

The example of FIG. 2B in which device 102 is shown as a wearable device such as a wrist-watch device with straps 19 is merely illustrative. As shown in FIG. 2B, device 102 may include a display such as display 15. Display 15 has been mounted in a housing such as housing 13. Housing 13, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 13 may be formed using a unibody configuration in which some or all of housing 13 is machined or molded as a single structure or may be formed using multiple structures (e.g., an internal frame structure, one or more structures that form exterior housing surfaces, etc.).

Display 15 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 15 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. Display 15 may be protected using a display cover layer such as a layer of transparent glass or clear plastic.

Device 102 may have one or more buttons 17 which may be used to gather user input. Buttons 17 may be based on dome switches or other switch circuitry. Buttons 17 may include button members that form push buttons (e.g., momentary buttons), slider switches, rocker switches, etc. Device 10 may also have additional buttons, a speaker port, data ports such as a digital data port and an audio connector port, and/or other input-output devices, if desired. In some embodiments, at least one of buttons 17 on the secondary user device 102 may be used to initiate payment with device 102 for a secure mobile transaction.

Figure 3:
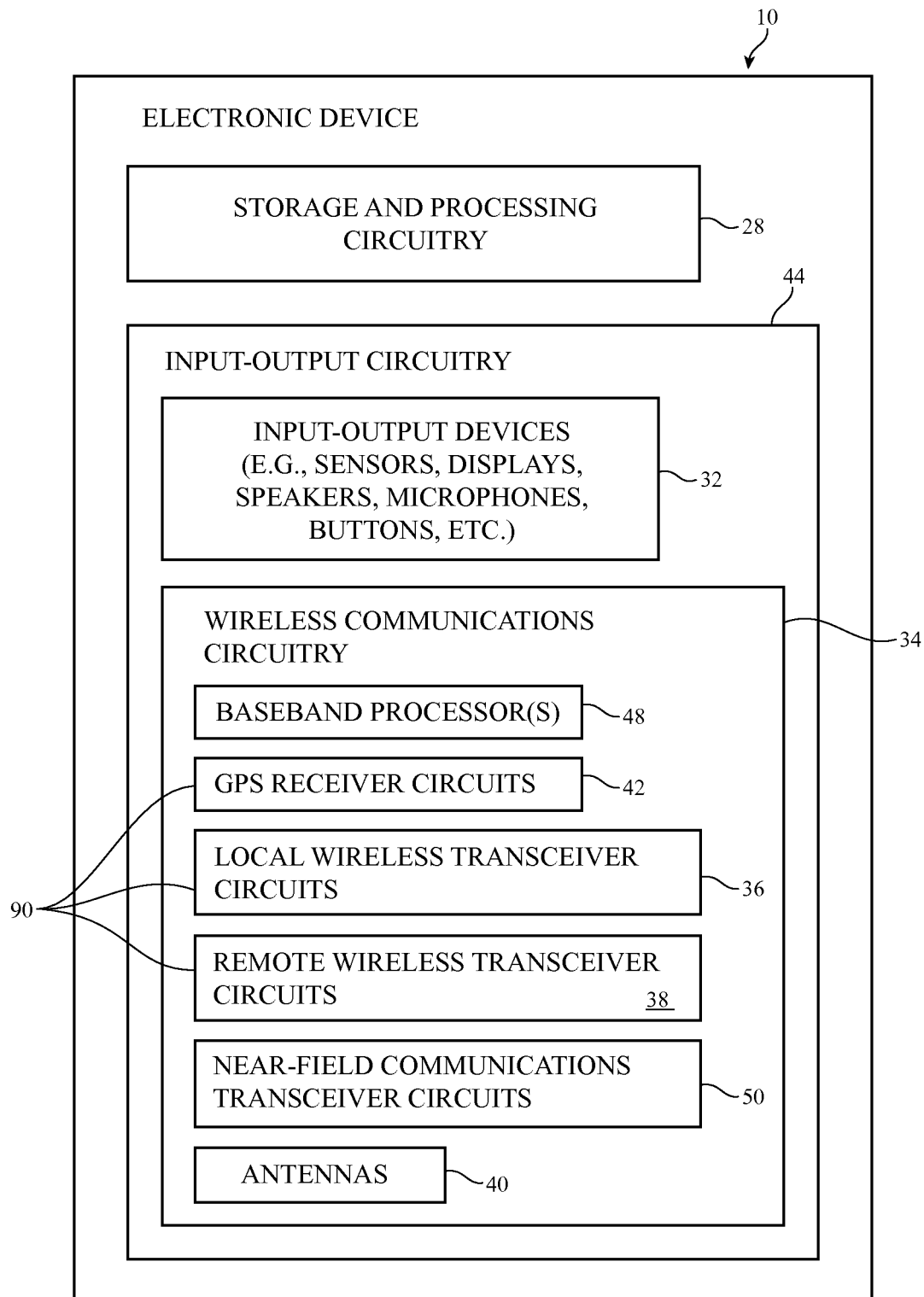
FIG. 3 is a schematic diagram of illustrative circuitry in the primary user device of FIG. 1 in accordance with an embodiment.

A schematic diagram showing illustrative components that may be used in device 10 is shown in FIG. 3. As shown in FIG. 3, device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, secondary device credential management applications, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, etc.

Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Input-output circuitry 44 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36 and 38. Transceiver circuitry 36 may be wireless local area network transceiver circuitry that may handle 2.4 GHz and 5 GHz bands for WiFi® (IEEE 802.11) communications and that may handle the 2.4 GHz Bluetooth® communications band. Circuitry 34 may use cellular telephone transceiver circuitry 38 for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 38 may handle voice data and non-voice data.

Wireless communications circuitry 34 may also include satellite navigation system circuitry such as global positioning system (GPS) receiver circuitry 42 for receiving GPS signals at 1575 MHz or for handling other satellite positioning data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless circuitry 34 may also include near-field communications circuitry 50. Near-field communications circuitry 50 may produce and receive near-field communications signals to support communications between device 10 and a near-field communications reader or other external near-field communications equipment. Near-field communications may be supported using loop antennas (e.g., to support inductive near-field communications in which a loop antenna in device 10 is electromagnetically near-field coupled to a corresponding loop antenna in a near-field communications reader). Near-field communications links typically are generally formed over distances of 20 cm or less (i.e., device 10 must be placed in the vicinity of the near-field communications reader for effective communications).

Transceiver circuitry 90 and NFC circuitry 50 may be coupled to one or more baseband processors 48. Baseband processor 48 may receive digital data to be transmitted from circuitry 28 and may supply corresponding signals to at least one of wireless transceiver circuits 90 for wireless transmission. During signal reception operations, transceiver circuitry 90 and NFC circuitry 50 may receive radio-frequency signals from external sources (e.g., wireless base stations, wireless access points, GPS satellites, NFC readers etc.). Baseband processor 48 may convert signals received from circuitries 90 and 50 into corresponding digital data for circuitry 28. The functions of baseband processor 48 may be provided by one or more integrated circuits. Baseband processor 48 is sometimes considered to be part of storage and processing circuitry 28.

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna. In addition to supporting cellular telephone communications, wireless local area network communications, and other far-field wireless communications, the structures of antennas 40 may be used in supporting near-field communications. The structures of antennas 40 may also be used in gathering proximity sensor signals (e.g., capacitive proximity sensor signals).

Radio-frequency transceiver circuitry 90 does not handle near-field communications signals and is therefore sometimes referred to as "far field" communications circuitry or non-near-field communications circuitry (e.g., transceiver circuitry 90 may handle non-near-field communications frequencies such as frequencies above 700 MHz or other suitable frequency). Near-field communications transceiver circuitry 50 may be used in handling near-field communications. With one suitable arrangement, near-field communications can be supported using signals at a frequency of 13.56 MHz. Other near-field communications bands may be supported using the structures of antennas 40 if desired.

Figure 4:
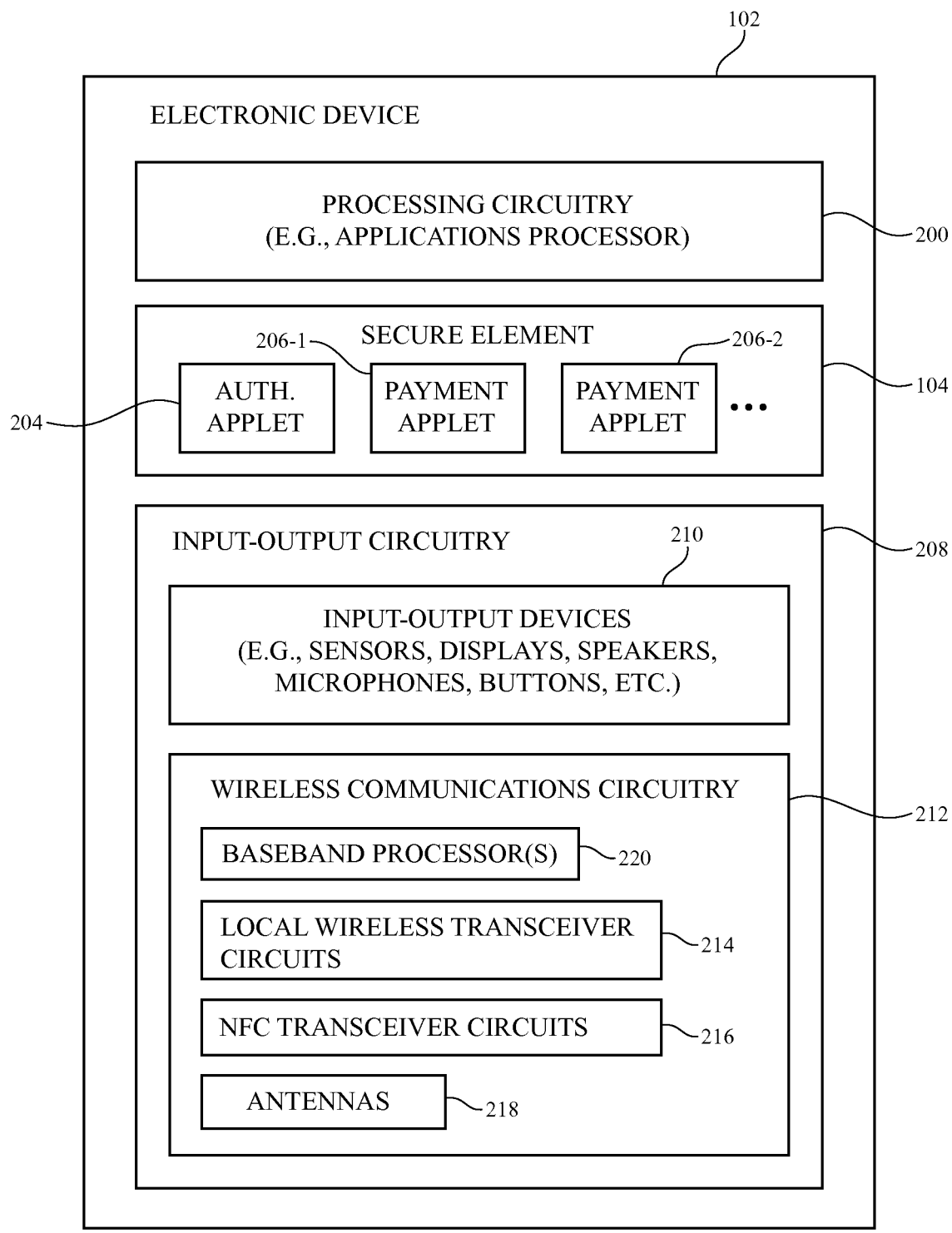
FIG. 4 is a schematic diagram of illustrative circuitry in the secondary user device of FIG. 1 in accordance with an embodiment.

A schematic diagram showing illustrative components that may be used in device 102 is shown in FIG. 4. As shown in FIG. 4, device 102 may include control circuitry such as processing circuitry 200. Circuitry 200 may also include storage such as hard disk drive storage, nonvolatile memory, volatile memory, etc. Processing circuitry 200 may be used to control the operation of device 10, to run one or more applications on device 102, and is sometimes referred to as an applications processor (AP). For example, processing circuitry 200 may be used to run software on device 102, such as internet browsing applications, voice-over-internet-protocol (VOIP) telephone call applications, email applications, media playback applications, operating system functions, mobile transactions applications, NFC applications, etc. Processing circuitry 200 may be based on one or more microprocessors, microcontrollers, digital signal processors, application specific integrated circuits, etc.

Device 102 may include input-output circuitry 208. Input-output circuitry 208 may include input-output devices 210. Input-output devices 210 may be used to allow data to be supplied to device 102 and to allow data to be provided from device 102 to external devices. Input-output devices 210 may include user interface devices, data port devices, and other input-output components. For example, input-output devices 210 may include touch screens, displays without touch sensor capabilities, buttons, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Input-output circuitry 208 may include wireless communications circuitry 212 for communicating wirelessly with external equipment. Wireless communications circuitry 212 may include local wireless transceiver circuits 214 that may handle 2.4 GHz and 5 GHz bands for WiFi® (IEEE 802.11) communications, the 2.4 GHz Bluetooth® communications band, or other short range communications bands for communicating with primary user device 10, additional user devices, or other external equipment that may be only tens or hundreds of feet away from device 102. If desired, device 102 may also include remote wireless transceiver circuits (not shown) such as cellular telephone transceiver circuitry for handling cellular telephone bands, global positioning system (GPS) receiver circuitry for handling GPS signals at 1575 MHz or for handling other satellite positioning data, or other long range communications bands for communicating with external equipment that may be thousands of feet or miles away.

Wireless circuitry 212 may also include near-field communications circuitry 216. Near-field communications circuitry 216 may produce and receive near-field communications signals to support communications between device 102 and a near-field communications reader (e.g., point-of-sale terminal 108) or other external near-field communications equipment. Near-field communications may be supported using loop antennas (e.g., to support inductive near-field communications in which a loop antenna in device 102 is electromagnetically near-field coupled to a corresponding loop antenna in a near-field communications reader). Near-field communications links typically are generally formed over distances of 20 cm or less (i.e., device 102 must be placed in the vicinity of the near-field communications reader for effective communications).

The transceiver circuits of circuitry 212 may be coupled to one or more baseband processors 220. Baseband processor 220 may receive digital data to be transmitted from processor 200 and may supply corresponding signals to at least one of wireless transceiver circuits 214 and 216 for wireless transmission (as an example). During signal reception operations, transceiver circuits 214 and/or 216 may receive radio-frequency signals from external sources (e.g., wireless access points, another user device, NFC readers, etc.). Baseband processor 220 may convert the received signals into corresponding digital data for processor 200. The functions of baseband processor 220 may be provided by one or more integrated circuits.

Wireless communications circuitry 212 may include one or more antennas 218. Antennas 218 may be formed using any suitable antenna types. For example, antennas 218 may include antennas with resonating elements that are formed from loop antenna structures, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming an NFC antenna. With one suitable arrangement, near-field communications can be supported using signals at a frequency of 13.56 MHz. Other near-field communications bands may be supported using the structures of antennas 218, if desired. The structures of antennas 218 may also be used in gathering proximity sensor signals (e.g., capacitive proximity sensor signals).

As described above in connection with FIG. 1, auxiliary user device 102 may include a secure element (SE) 104. As shown in FIG. 4, secure element 104 may include one or more applications or "applets" that run as part of the operating system of secure element 104 (e.g., as a plug-in to a Java runtime environment executing on SE 104). For example, secure element 104 may include an authentication applet 204 that provides contactless registry services (CRS), encrypts/decrypts data that is sent to and received from a trusted processor, sets one or more flags (e.g., an authentication complete flag) in the operating system of SE 104, and/or controls the activation/deactivation of one or more payment applets 206 (e.g., payment applets 206-1, 206-2, etc.) on secure element 104. Authentication applet 204 is therefore sometimes referred to as the CRS applet. Commercial credentials associated with a given payment card may be stored in a particular "container" on secure element 104, which is basically the instantiation of a payment applet combined with the encrypted payment data for that instantiation. For example, if two Visa cards are to be provisioned onto the secure element, a Visa payment applet would be instantiated twice into two different containers on the secure element. Each container may have a unique identifier known as an application ID, AID, or payment applet identifier.

In one suitable arrangement, applications processor 200 on secondary user device 102 may be configured to run a mobile payments application. This payments application may allow the user to store credit cards, debit cards, retail coupons, boarding passes, event tickets, store cards, gift cards, loyalty cards, generic cards, and/or other forms of mobile payment. Each of these digital cards, coupons, or tickets is sometimes referred to as a "pass." As a result, the mobile payments application is sometimes referred to as a "passbook" application or a digital wallet application. Passes may be loaded onto the secondary user device 102 using the broker module 114 (FIG. 1).

The application ID for a particular payment card may be written into the pass that is received from the broker module. When the applications processor wants to enable payment for a particular card, the applications processor tells the secure element to activate the payment applet with the corresponding AID. Each pass (sometimes referred to herein as passbook pass, a digital wallet pass, etc.) in the passbook may be either in an activated (or "personalized") state or a disabled (non-personalized or personalizing) state. A personalized pass may indicate that a corresponding payment applet 206 has been provisioned with the desired commerce credential and is ready for payment. A non-personalized pass may indicate that a corresponding payment applet 206 has not yet been provisioned with the necessary commerce credential and is therefore not payment-ready.

CRS applet 204 may be executed in a master or "issuer" security domain (ISD) in secure element 104, whereas payment applet(s) 206 may be executed in supplemental security domains (SSDs). For example, keys and/or other suitable information for creating or otherwise provisioning one or more credentials (e.g., credentials associated with various credit cards, bank cards, gift cards, access cards, transit passes, etc.) on device 102 and/or for managing credential content on device 102 may be stored on the CRS applet 204. Each payment applet 206 may be associated with a specific credential (e.g., a specific credit card credential, a specific public transit pass credential, etc.) that provide specific privileges or payment rights to device 102. Communications between these security domains may be encrypted using different encryption/decryption keys that are security-domain specific (e.g., each SSD may have its own manager key associated with a respective payment applet 206 that is used to activate/enable a specific credential of that SSD for use during an NFC-based transaction at merchant terminal 108).

Referring back to FIG. 1, consider an example in which a user has more than one user devices such as devices 10 and 102. In a first scenario, the user may provision credentials on both devices 10 and 102 by separately entering required information (e.g., one or more credit card numbers and associated card verification values, answers to challenging questions, etc.) on each device. This approach can be tedious, particularly when the user has even more devices he or she may wish to provision.

Consider another scenario in which the user wishes to provision credentials only on the secondary user device 102. In some arrangements, the secondary user device 102 may be smaller in size than the primary user device 10 (i.e., the primary user device 10 may offer a larger display/touch screen for a more pleasant user input experience). In such instances, it may be more desirable for the user to perform account setup and verification (e.g., to enter the required payment information) once on the primary user device 10 and then to have the desired credentials be provisioned onto the secondary user device 102 while requiring only minimal input from the user. The provisioning of credentials onto one or more secondary devices 102 conducted in this way may provide a more seamless experience to the user since the user does not actually have to enter sensitive credential information directly on the secondary user device 102. Once the secondary device(s) 102 are provisioned, device(s) 102 are ready to perform payments at a merchant terminal 108.

Figure 5:
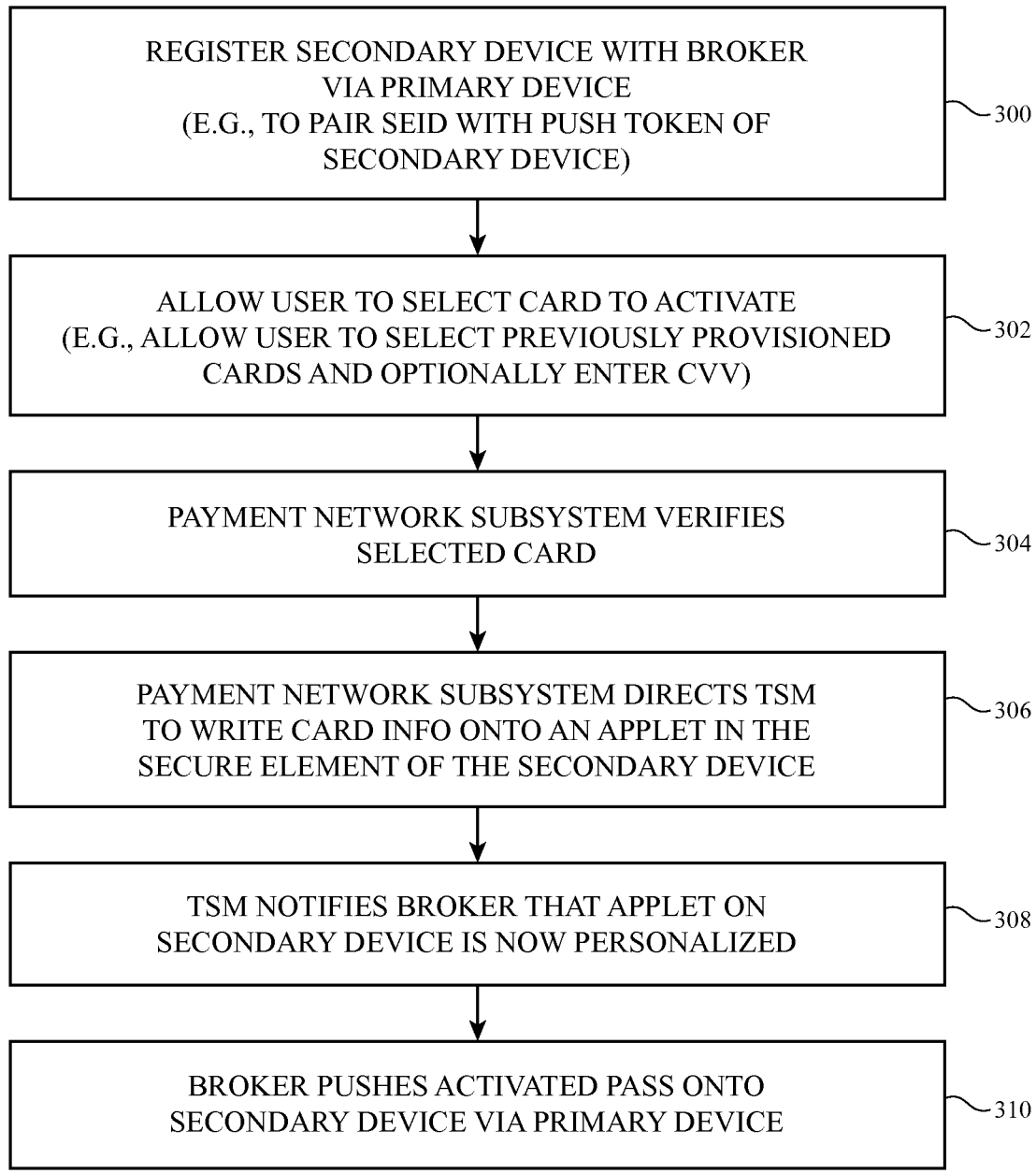
FIG. 5 is a flow chart of illustrative steps for provisioning credentials onto the secondary user device via the primary user device in accordance with an embodiment.

FIG. 5 is a flow chart of illustrative steps involved in provisioning credentials onto a secondary user device 102. At step 300, the secondary user device may be registered with the service provider broker module 114 via the primary user device 10. During this registration process, the secondary device may provide its SEID and push token to broker module 114. The push token serves as a unique identifier that allows the service provider subsystem to send efficient, low-power messages to the secondary device delivered via a proxy server (e.g., the push token may be an address indicator for the secondary device so that the service provider subsystem 112 knows which user device contains the secure element with the corresponding SEID). In other words, this registration step serves to pair the SEID with the push token of the secondary device.

At step 302, the user is provided with the opportunity to select a card at the primary user device to activate (or "personalize") a payment card. For example, the user may select one of the previously provisioned cards (e.g., cards that are already provisioned on the primary user device 10 or cards that have previously been associated with that user's account at the service provider subsystem) and optionally enter a card security code, answers to one or more challenging questions, the expiration date for the selected card, the billing address for the selected card, and/or provide other verification information. As another example, the user may elect to enter a new card to provision on the secondary device. In such scenarios, the user may need to provide the complete payment card number (sometimes referred to as the funding primary account number or "F-PAN") and all associated security information. As yet another example, the user may also elect to take a photo of a payment card and have the primary user device extract the card information from the photo. The user may still need to enter the card security code manually.

At step 304, payment network subsystem 118 may verify the validity of the selected card (e.g., by checking whether the entered security code is correct) and may subsequently direct broker module 114 to forward a pass to the secondary user device. At this point, the pass may be visible to the user at the secondary device 102 (e.g., via the passbook application) but may not yet be enabled for payment because the associated payment applet 206 has yet to be personalized.

At step 306, the payment network subsystem may direct the service provider TSM 116 to write the desired credential information (e.g., a device primary account number associated with the provisioned payment card) onto the corresponding payment applet 206 in secure element 104. At this point, the payment applet has been personalized with the credentials necessary to carry out a financial transaction. At step 308, TSM 116 may then notify broker module 114 that a particular payment applet 206 on the secondary device has now been personalized. At step 310, broker module 114 may push an updated pass to the secondary user device via the primary device 10. At this point, the pass can be selected by the user to perform a mobile payment because the corresponding applet 206 has now been activated for payment.

As illustrated in this example, broker module 114 at the service provider subsystem may be configured to manage the passbook application on the secondary user device 102, whereas the TSM module 116 at the service provider subsystem may be configured to communicate directly with the secure element 104 within the secondary user device 102. The steps of FIG. 5 are merely illustrative and do not serve to limit the scope of the present invention. In other suitable embodiments, the steps of using the trusted service manager to instantiate a payment applet on the secure element (e.g., steps 306 and 308) may be performed before the payment network subsystem verifies the selected card at step 304. If desired, the steps may be performed in a different order and other steps (i.e., alternative steps or additional steps) may be performed to ready secondary user device 102 for payment.

Figure 6:
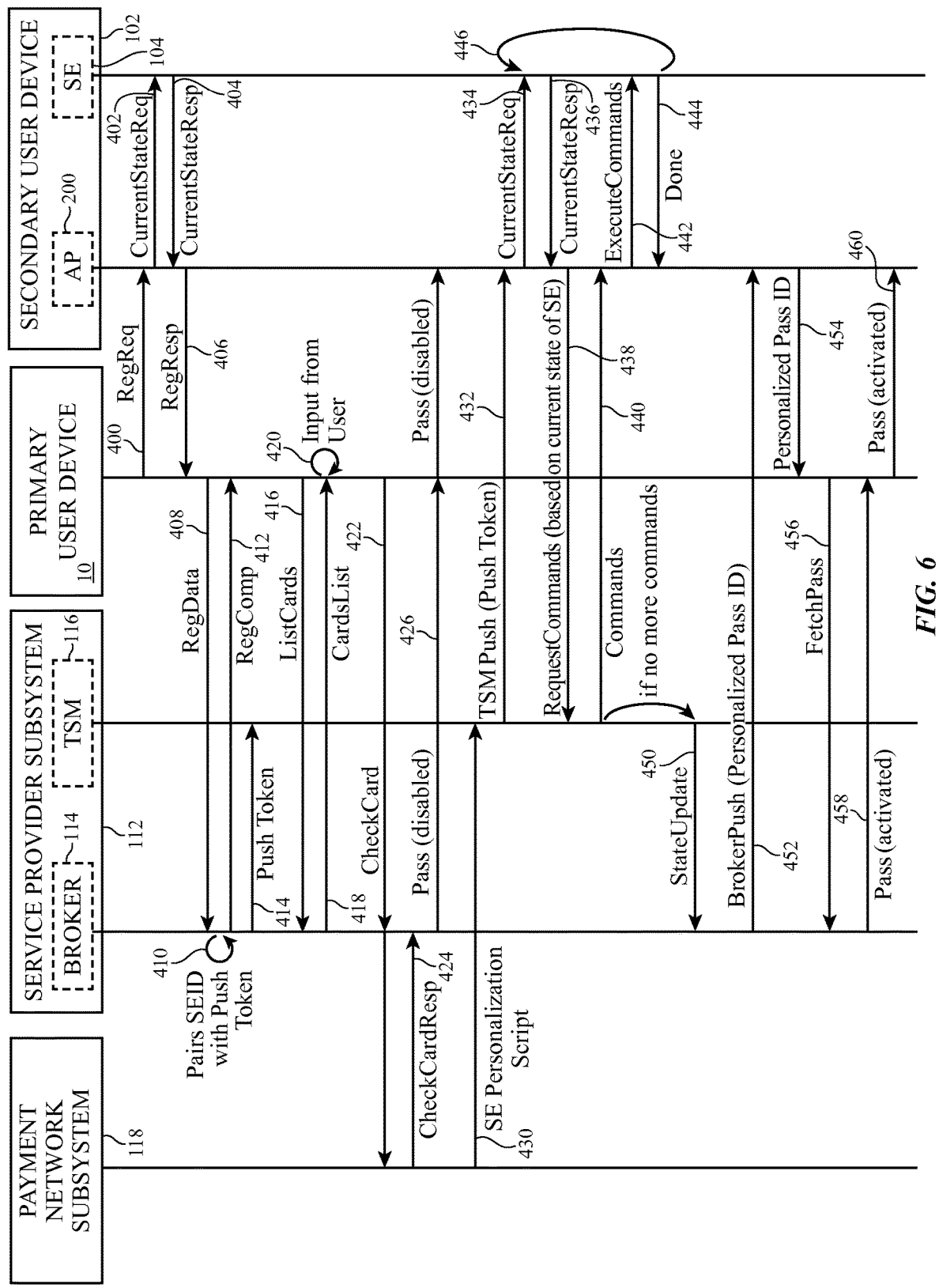
FIG. 6 is a diagram illustrating the flow of information among the different subsystems in the system of FIG. 1 during operations for provisioning credential information onto the secondary user device in accordance with an embodiment.

FIG. 6 is a diagram illustrating the flow of information among the different subsystems in system 100 of FIG. 1 during operations for provisioning credential information onto the secondary user device. As described previously in connection with FIG. 3, a bridge application (e.g., a secondary user device credential provisioning management application) that is running on processing circuitry 28 of primary user device 10 may be responsible for performing at least some of the different steps shown in FIG. 6.

At step 400, the primary user device 10 may send a registration data request "RegReq" to the applications processor 200 on the secondary user device 102. In response to receiving RegReq from device 10, applications processor 200 may send a current state request "CurrentStateReq" to secure element 104 (step 402). In general, any communication with secure element 104 may be handled by a secure element daemon (SEd) running on secure element 104. At step 404, secure element 104 may then respond with a current state response "CurrentStateResp." This response may, for example, include the SEID of secure element 104, information indicative of how many payment applets are currently instantiated on secure element 104 (e.g., information indicative of currently provisioned credentials on secure element 104, if any), and/or other information reflective of the current state of the secure element 104.

At step 406, applications processor 200 may send a registration data response "RegResp" back to the primary user device 10. In particular, RegResp may include information from the SE current state response and additional information related to that particular secondary user device including but not limited to: the serial number of that particular device 102, the name of that device 102 (i.e., a name given by the user such as "my Accessory"), a push token (e.g., a network address for that particular device), and other suitable information related to the secondary user device as a whole.

At step 408, the primary user device may forward the registration data "RegData" received from applications processor 200 to broker module 114. At step 410, broker module 114 may pair the received SEID with the received push token so that service provider system 112 knows on which user device the corresponding secure element resides. At step 412, a registration completion message "RegComp" is sent from broker module 114 to the primary user device 10 to signify the end of registration. At step 414, broker module 114 may forward the received push token to the TSM 116 so that the TSM knows which user device to talk to in order to access the desired secure element.

Steps 400, 402, 404, 406, 408, 410, and 414 may be performed once when the secondary user device 102 is powered on, may be performed on a periodic basis, may be performed in response to input from the user that initiates credential provisioning operations, or may be performed at other fixed/variable time intervals.

In response to receiving input from the user at the primary device 10 indicating the desire to provision cards (or digital wallet passes) onto the secondary user device, a "ListCards" request may be sent from device 10 to broker module 114. In general, broker module 114 may maintain a list of cards that have been previously provisioned to that user. The list of cards may be linked to an account that the user holds with the service provider subsystem 112. The user may have to be logged in into his or her account using a username and associated password in order to access the list of cards (as an example).

Assuming the user is logged in, broker module 114 may forward a "CardsList" to the primary user device 10 (at step 418). At step 420, a list of known cards may be presented to the user, and the user may be given an opportunity to select one or more cards from the CardsList to provision onto the secondary user device 102. In one suitable arrangement, only a subset of digits for each payment card (e.g., only the last four digits of the funding primary account number) is displayed on the CardsList to prevent fraud. In another suitable arrangement, only the name of each payment card is displayed (e.g., "myAmexCard," "myStarbucksCard," "mySouthwestBoardingPass," "myAmazonGiftCard," etc.).

When a card is selected, additional input from the user may be required to provide an additional level of security without being overly burdensome to the user. For example, the user may select a payment card and then be required to enter a corresponding card verification value (CVV). As another example, the user may select a payment card and then be required to enter a corresponding expiration date. As yet another example, the user may select a payment card and then be required to enter a corresponding billing address. These examples are merely illustrative. If desired, other types of information may be requested from the user to verify that the intended user is in possession of the user devices. In general, the requested information should be relatively easy for the user to provide but should only be known to the intended user. In order to not overly burden the user, the user should not need to enter the entire payment card number unless that payment card has not previously been provided to service provider subsystem 112.

At step 422, the primary user device 10 may send a "CheckCard" request to broker module 114, which then forwards that request to the payment network subsystem 118. The CheckCard request may include the card verification information provided by the user at step 420. At step 424, the payment network subsystem 118 may send a "CheckCardResp" back to broker module 114. This check card response may either indicate a successful card verification attempt or a failed card verification attempt. In the event of a failed attempt, the user may be provided with another opportunity to enter the correct verification information. If desired, the user may only be given a limited number of chances to provide the correct input. For example, the user may only be allowed three failed attempts before the device is temporarily suspended for payment. As another example, the user may only be provided up to five attempts before the device is temporarily suspended for payment.

In yet other suitable embodiments, the user may be required to enter other types of one time passwords (OTPs) provided from the service provider subsystem via other secure channels (e.g., the payment network subsystem may require the user to perform an additional verification step prior to fully activating the card at the payment network subsystem). For example, the payment network subsystem may send a list of available contact/verification methods on file (e.g., contact methods including text message, e-mail, automated telephone call, etc.) to the broker module as part of the CheckCardResp, which can then be forwarded to the primary device. The user may select a desired verification/contact method on the primary device from the list, and the selected verification method may then be relayed back to the payment network subsystem via the broker module. The payment network subsystem will then send a verification code "out-of-band" via the selected contact method. Once the user has received the verification code that was sent out-of-band by the payment network subsystem, the user may enter the verification code on the primary user device. The code is then delivered to the broker module, when then forwards the code to the payment network subsystem. In response, the payment network subsystem indicates to the broker module that the card is now active (as far as the payment network is concerned).

In the event of a successful card verification attempt, broker module 114 may load a digital wallet pass corresponding to the selected payment card onto applications processor 200 using the primary user device 10 as a proxy (step 426). The pass may include information such as the name of the financial institution associated with that payment card (e.g., Visa, MasterCard, etc.), a device primary account number identifier (or D-PAN ID) that is associated with that payment card, metadata for displaying useful information such as a payment network logo to the user so that user can readily recognize this card on the passbook application, information reflective of the current state of the card (e.g., information indicative of whether the pass has been personalized), the ID of an associated payment applet on the secure element 104 (sometimes referred to herein as application ID, applet ID, or simply AID) so that secure element 104 knows which payment applet to personalize for that payment card, and other suitable information. The applet ID may refer to a particular slot on the secure element 104 at which a corresponding payment applet 206 may be installed. At this point, the pass may have yet to be personalized (i.e., additional commerce credentials still need to be loaded into the secure element). As a result, the pass may be visible to the user at the secondary user device but may be unavailable to the user for performing financial transactions at a merchant terminal.

The D-PAN ID can be used by the payment network subsystem to map the D-PAN ID back to an actual D-PAN. The D-PAN may be a virtual credential that is provided from the payment network subsystem 118 and that is linked to an actual credential (i.e., the actual serial number of the payment card, sometimes referred to as the funding primary account number or F-PAN) via a virtual linking table that is stored on the payment network subsystem. Even though the D-PAN and F-PAN are closely related by the virtual linking table, the user is only aware of the F-PAN since that is the number that the user will recognize as matching their physical card (e.g., the D-PAN is typically not visible to the user). For security reasons, the D-PAN should not be written into the pass (e.g., the applications processor never sees the D-PAN). By provisioning a virtual credential on the user devices rather than an actual credential, system 100 (FIG. 1) can further limit the fraudulent activity that may result when the virtual credential is intercepted by an authorized user.

While broker module 114 is transferring the pass to applications processor 200, the payment network subsystem 118 may forward a secure element (SE) personalization script to the TSM module 116 (at step 430). The SE personalization script may include a series of commands that needs to be executed on the secure element 104 to enable the payment function for the card currently being provisioned (e.g., a series of commands that direct TSM 116 to load desired commerce credential information onto a particular payment applet in the secure element).

At step 432, TSM 116 may send a TSM push notification "TSMPush" to the target user device using the push token received during step 414. In general, a push notification may be defined as an efficient, low-power message that is delivered to the secondary device via a proxy server that aggregates such messages from many servers and that delivers the aggregated messages over a single connection to the secondary device. In this example, the push notification may be sent to the applications processor 200 in the secondary user device 102 via the primary user device 10 as an intermediary forwarding agent. This TSMPush notification may then direct the applications processor 200 within the secondary user device 102 to begin querying the TSM 116 for commands. In response to receiving the TSMPush notification from TSM 116, applications processor 200 may send a request CurrentStateReq to secure element 104 (step 434). At step 436, secure element 104 may then respond with CurrentStateResp. This response may, for example, include the SEID of secure element 104, information indicative of which applets are currently installed on secure element 104, information indicative of currently provisioned cards on secure element 104 (if any), and/or other information reflective of the current state of the secure element 104.

At step 438, applications processor 200 may send a command request message "RequestCommands" to TSM 116. This message delivers the current state information of secure element 104 so that TSM 116 knows what commands need to be issued for updating the secure element. At step 440, TSM 116 may send commands back to applications processor 200. At step 442, these commands may be forwarded to secure element 104 for execution. During these steps, the D-PAN may be written, in encrypted form, into a slot on the secure element that corresponds to the applet ID associated with the currently provisioned pass. When the commands have been performed, secure element 104 may respond with a "Done" notification (step 444). In general, steps 432, 434, 436, 438, 440, 442, and 444 may be performed multiple times asynchronously with the broker operations to ensure that one or more payment applets 206 on secure element 104 has been loaded with the necessary information to conduct a payment (as indicated by arrow 446).

When there are no more commands from the TSM to be executed, TSM 116 may send a state update notification "StateUpdate" to broker module 114 (step 450). This StateUpdate informs broker module 114 that the payment card has now been personalized at the secondary user device. In response to receiving StateUpdate, broker module 114 may send a broker push notification "BrokerPush" to applications processor 200 on the secondary device 102 (step 452) using the push token received during step 414. The BrokerPush may include the ID of the pass for which the corresponding payment applet on the secure element has just been updated.

At step 454, applications processor 200 may relay the personalized pass ID back to the primary user device 10. In response to receiving this notification from applications processor 200, primary user device 10 may send a "FetchPass" request to broker module 114 (at step 456). In response, the broker module 114 may forward a latest version of the pass (e.g., a pass that has now been activated for payment) back to the applications processor 200 through the primary user device 10 (steps 458 and 460). At this point, the user should now be able to see that the pass on the digital wallet application can be selected for payment. Once the secondary device has been provisioned with commerce credentials, the secondary device can be used to perform mobile financial transactions at a point-of-sale terminal independent from the primary user device.

In the scenario described above in which the user has to enter a verification code that is sent out-of-band from the payment network subsystem, it is possible that the secure element personalization steps (i.e., steps 430, 432, 434, 436, 438, 440, 442, 444, and 450) are performed before the user has had a chance to enter the verification code. In such scenarios, when the user actually enters the code on the primary user device, the payment network subsystem will then indicate to the broker module that the card is now activated. As a result, the broker module can then send the pass update push notification (step 452) to initiate sending of an activated pass to the secondary device.

The operations of FIGS. 5 and 6 for provisioning commerce credential onto a secondary device 102 using a primary user device 10 is merely illustrative and does not serve to limit the scope of the present invention. If desired, the approach of the type described in connection with FIGS. 5 and 6 can be extended to provision payment cards onto more than one secondary user devices, accessories, and other suitable electronic components. In yet other suitable embodiments, sensitive user data other than commerce credentials may be transferred onto a secondary user device in this way.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

The foregoing is merely illustrative of the principles of this invention and various modifications can be made by those skilled in the art. The foregoing embodiments may be implemented individually or in any combination.

Although the invention has been described in some detail for the purposes of clarity, it will be apparent that certain changes and modifications can be practiced within the scope of the appended claims. Although some of the appended claims are single dependent only or reference only some of their preceding claims, their respective feature(s) can be combined with the feature(s) of any other claim.

What is claimed is:

1. A method for using a service provider subsystem to provision a payment card onto a secondary device via a primary device, comprising:
   at the service provider subsystem, receiving information associated with the secondary device from the primary device;
   registering the secondary device at the service provider subsystem based at least in part on a push token associated with the secondary device;
   sending a disabled digital wallet pass corresponding to the payment card from the service provider subsystem to the secondary device through the primary device;
   with the service provider subsystem, sending a notification to the secondary device, based at least in part on the received push token, to begin updating a configuration of the secondary device; and
   after updating the configuration of the secondary device, sending an activated digital wallet pass corresponding to the payment card from the service provider subsystem to the secondary device through the primary device.

2. The method defined in claim 1, wherein the secondary device includes a secure element, and wherein receiving the information associated with the secondary device comprises receiving information reflective of a current state of the secure element in the secondary device.

3. The method defined in claim 1, wherein the secondary device includes a secure element having a unique secure element identifier (ID), wherein the push token is uniquely associated with the secondary device, and wherein receiving the information associated with the secondary device comprises receiving the secure element ID and receiving the push token, the method further comprising:
   pairing the secure element ID with the push token using a broker module at the service provider subsystem, wherein sending the disabled digital wallet pass comprises sending the disabled digital wallet pass to the secondary device using the broker module.

4. The method defined in claim 3, further comprising:
   with the broker module, providing the primary device with a list of payment cards from which a user is given an opportunity to select the payment card; and
   in response to receiving user input from the primary device, forwarding the user input to a payment network subsystem to determine whether the user input is valid.

5. The method defined in claim 3, further comprising:
   with a trusted service manager module at the service provider subsystem, receiving the push token from the broker module.

6. The method defined in claim 5, further comprising:
   with the trusted service manager module, receiving a secure element personalization script from a payment network subsystem, wherein sending the notification to the secondary device based at least in part on the received push token comprises, in response to receiving the secure element personalization script from the payment network subsystem, sending a trusted service manager push notification to the secondary device using the push token received from the broker module.

7. The method defined in claim 6, wherein updating the configuration of the secondary device comprises sending commands from the trusted service manager module to the secondary device, and wherein the commands update a payment applet on the secure element.

8. The method defined in claim 7, further comprising:
   with the trusted service manager module, sending a state update notification to the broker module after the commands have been executed;
   in response to receiving the state update notification from the trusted service manager module, using the broker module to send a broker push notification to the secondary device; and
   with the broker module, receiving a fetch pass request from the primary device, wherein sending the activated digital wallet pass comprises, in response to receiving the fetch pass request from the primary device, using the broker module to send the activated digital wallet pass to the secondary device, and wherein the activated digital wallet pass is payment-ready.

9. The method defined in claim 1, wherein the secondary device includes a secure element, wherein updating the configuration of the secondary device comprises updating a payment applet in the secure element with commerce credential information for the payment card, and wherein the disabled digital wallet pass is indicative of the payment applet excluding the updated commerce credential information and the activated digital wallet pass is indicative of the payment applet including the updated commerce credential information.

10. The method defined in claim 1, wherein the secondary device includes a secure element, and wherein sending the disabled digital wallet pass comprises sending a payment applet identifier that identifies a particular slot on the secure element that a payment applet is to be installed.

11. The method defined in claim 1, wherein the disabled digital wallet pass configured to be visible to the user at the secondary device but not payment-ready.

* * * * *